United States Patent [19]
Louvel

[11] 3,777,287
[45] Dec. 4, 1973

[54] WIDE BAND POLARIZING T-CONNECTION

[75] Inventor: Guy Louvel, Antony, France

[73] Assignee: Compagnie Industrielle des Telecommunications Cit-Alcatel, Paris, France

[22] Filed: June 26, 1972

[21] Appl. No.: 266,018

[30] Foreign Application Priority Data

June 25, 1971 France ..........................7123371

[52] U.S. Cl.............................. 333/84 M, 333/97 R
[51] Int. Cl........................... H01p 5/08, H01p 3/08
[58] Field of Search..................... 333/9, 84 M, 97 R

[56] References Cited

UNITED STATES PATENTS

| | | | |
|---|---|---|---|
| 3,678,414 | 7/1972 | Hallford | 333/84 M |
| 3,252,112 | 5/1966 | Haver | 333/97 R |
| 3,246,265 | 4/1966 | Smith-Vaniz | 333/84 M |

*Primary Examiner*—Rudolph V. Rolinec
*Assistant Examiner*—Wm. H. Punter
*Attorney*—Paul M. Craig, Jr. et al.

[57] ABSTRACT

Device enabling a double polarization of two active circuits connected in hyperfrequency to be produced while avoiding a prohibitive proportion of stationary waves comprising two microstrips connected by a capacitor for blocking the continuous voltage ensuring the high frequency connection between the active circuits and two quarter wave lines connected perpendicularly to these microwaves. The distance between the two connection points and the quarter wave lines is equal to three quarters of a wavelength of the central frequency of the operation band.

4 Claims, 2 Drawing Figures

WIDE BAND POLARIZING T-CONNECTION

The present invention concerns a wide band polarizing T-connection, operating more particularly at hyperfrequencies.

The manufacturing of simple T-connections enabling active circuits to be polarized by a continuous voltage supply while ensuring the passing of alternating currents is known. These T-connections are constituted by a "horizontal" branch at whose two ends are arranged the input and output terminals, and by a "vertical" branch by whose end the continuous voltage is applied. In one of the horizontal half branches is inserted a capacitor which stops the continuous current and allows the alternating current to pass. In the vertical branch is arranged an inductance allowing the continuous current to pass and stopping the alternating current, so that it cannot return towards the continuous voltage supply. At high frequencies the inductance is replaced by a quarter wave line short-circuited at the supply side end by a high capacity capacitor, this having the effect of bringing back to the other end a practically infinite impedance. In this way a continuous current may be made to pass while the return of the alternating current towards the continuous voltage supply is prevented.

Nevertheless, T-connections such as described above have a double disadvantage: firstly, they allow the polarizing of only one active circuit, then the proportion of stationary waves measured at the HF input of the circuit greatly depends on the frequency, subsequent to the dependency of the response to the quarter wave line in relation to the frequency. In hyperfrequency circuits the case of two active circuits, such as a varactor diode and an amplifying transistor which must be interrelated, may be anticipated, each of these active circuits requiring a separate polarization. These devices require two conventional polarizing T-connections. Each of these conventional T-connections has, in the vicinity of the central frequency, for example, at the output, and at the point equivalent to twice that frequency, a prohibitive proportion of stationary waves.

The device according to the present invention enables these disadvantages to be overcome. Indeed, in the latter, it is possible to effect double polarizing of two active circuits, while keeping to a low proportion the amount of stationary waves in a wide frequency range.

The invention has for its object a wide band polarizing T-connection operating at hyperfrequencies, supplying at least two active circuits connected by a high frequency branch in which is inserted a capacitor for blocking continuous current, the said T-square consisting of at least two polarizing branches each polarizing the said active circuit from a continuous voltage supply short-circuited in alternating current by a bypass capacitor and connected up to the said high frequency branch at two points situated on either side of the said blocking capacitor, characterized in that the impedance of the said high frequency branch has a high value at the ends of that branch, and a low value on either side of the said blocking capacitor, the transition being effected from connection points of the said polarizing branches on the side nearest these ends.

With reference to the diagrammatic FIGS. 1 and 2 herewith, an example of the implementing of the present invention will be given herebelow, this example being given purely by way of illustration, and having no limiting character. The same elements shown in the two figures bear, in these latter, the same references.

Figure 1:
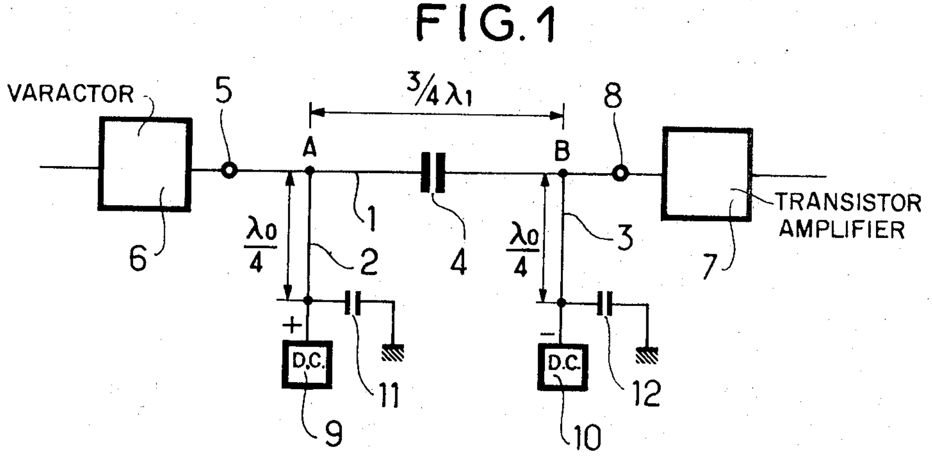
FIG. 1 shows a schematic circuit diagram of a polarizing T-connection according to the present invention.

In FIG. 1 may be seen a polarizing T-connection consisting of a signal branch 1 and two polarizing branches 2 and 3 so that this T-connection may be referred to as a "double T-connection." In the signal branch 1, which consists of a transmission line, is arranged a capacitor 4 capable of allowing the high frequency signals to pass, but stopping the continuous voltage currents.

The high frequency signals originate, for example, at the terminal 5 connected to a diode having a variable capacity, such as a varactor 6. The HF signals may be amplified by a transistor 7 whose collector, for example, is connected to the terminal 8. In that example, the varactor 6 and the transistor 7 must be polarized by continuous voltage supplies, one of which 9 may be positive and the other 10 negative.

The polarizing branches 2 and 3 enable these various polarizations to be ensured by means of the separation effected by the capacitor 4.

In order to prevent the high frequency signals from returning to the supply points 9 and 10, the polarizing branches 2 and 3 each consist of a quarter wave line, having a length equal to $\lambda 0/4$ and they are connected to ground on the side nearest the supply by high value bypass capacitors 11 and 12. Impedance transformers, which bring practically infinite impedances at fo back to the point A and B are thus produced.

The wavelength $\lambda 0$ corresponds to the central operating frequency fo of the device, which may be equal to 4 GHz. For example, the device is required to function in a very wide range of frequencies, that is, the proportion of stationary waves observed at the terminals 5 and 8 should be less than 1.5, for example. To fulfill that condition, the distance between the points A and B on the high frequency branch must be equal to three quarters of the wavelength $\lambda 1$. The wavelength $\lambda 1$ depends on the dielectric material constituting the transmission line comprised between the points A and B. It corresponds to the central operation frequency of the device, which is, for example 4 GHz. The second condition for the proportion of stationary waves to be comprised between acceptacle limits is that the relation between the characteristic impedances of the polarizing branches 2 and 3 and that of the signal branch 1 comprised between the two points A and B be very much greater than 1. By way of an example, a preferential value of the characteristic impedance of the high frequency branch is 10 ohms, whereas that of the polarizing branch is 200 ohms.

Figure 2:
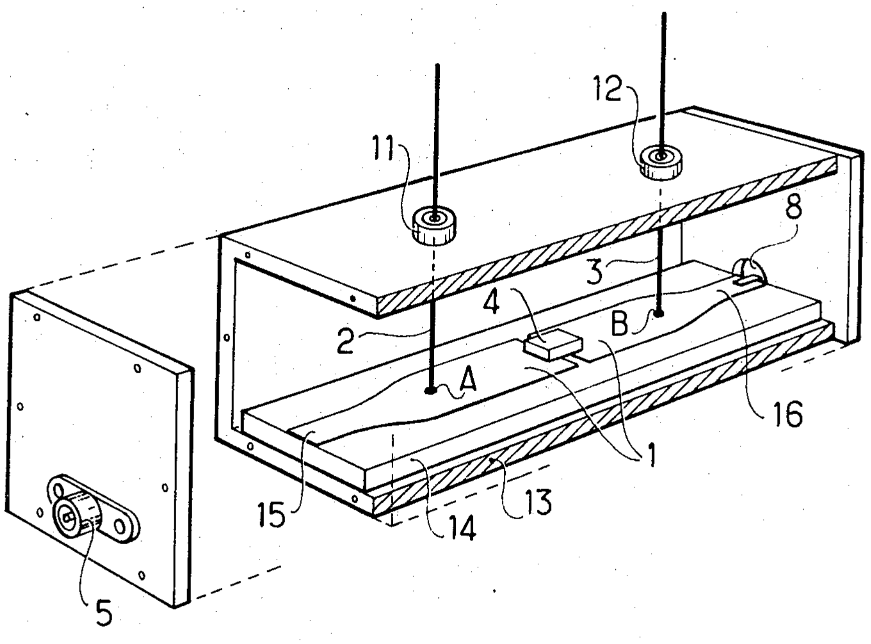
FIG. 2 shows diagrammatically a perspective view of the housing containing the double polarizing T-connection in accordance with one embodiment of the present invention.

FIG. 2 shows an example of an embodiment of the device according to the invention, in a very enlarged form. The double polarizing T-connection is enclosed in a housing 13 made of aluminum or another substance having high electrical conductivity, whose shape is that of a parallelepiped. To enable the inside of the housing to be seen, one of the transverse walls has been brought to the front of the drawing, and another longitudinal wall has not been shown.

The high frequency branch 1 in the form of a microstrip having a variable width is arranged on the bottom of the housing 13. Between the microstrip and the bottom of the housing, a layer of dielectric substance 14, whose dielectric constant must be greater than ten, is seen. The greater the dielectric constant is, the shorter the length AB, which depends on the operational wavelength, becomes. With a dielectric substance whose dielectric constant is sixteen, and a central operation frequency of 4 GHz, the wavelength in the dielectric substance is equal to $\lambda 1 = 1.8$ cm. The distance AB equal to 3 $\lambda/4$ then has a value of 1.4 cm. The microstrip is in the form of two optimized transitions having slight widths at the ends 15 and 16. These ends are in contact with the central conductors of the coaxial sockets 5 and 8 through which the high frequency power is transmitted. At these ends 15 and 16, the characteristic impedance is 50 ohms, to enable an adequate connection with the standard sockets 5 and 8. At A and B, the microstrip is wider so as to have a lower characteristic impedance, which may be 10 ohms, for example.

Between the impedances of 50 ohms and 10 ohms, the microstrip has a progressively increasing width in order to produce a regular transition. The length of that transition is equal to a quarter of a wavelength in the dielectric substance at the lowest operating frequency. If the latter is 1 GHz, and if the support substance has a dielectric constant of 16, the wavelength in the dielectric substance is equal to 7.5 cm. The length of the transition comprised between the point A and the coaxial socket 5 equal to a quarter of that wavelength is 1.8 cm. The two parts of the microstrip are connected by the capacitor 4, which may be a ceramic capacitor. Its capacity may be 1,000 picofarads.

The polarization branches 2 and 3 consisting of copper wire or the like, whose diameter may be a tenth of a millimeter, are arranged perpendicular to A and B. That wire has, at high frequency, a characteristic in the order of several hundreds of ohms. That characteristic impedance depends on the thickness of the wire, and on its distance from the walls of the housing. The wires constituting the polarizing branches 2 and 3 are connected to one of the capacitor plates 11 and 12. The other capacitor plates are connected to ground through the housing. These capacitors may be of the "bypass" type having a central plate to which is connected the continuous polarizing circuit. The capacity of the capacitors 11 and 12 must be greater than 10,000 picofarads. The length of the wire comprised between the capacitors 11 and 12 and the points A and B is equal to a quarter of a wavelength in the air, at the central operating frequency. In our example, that frequency being 4 GHz, the quarter wavelength in the air is equal to 1.8 cm.

The device according to the present invention may operate in a range of four octaves, for example, between 1 and 16 GHz. In that range, the proportion of stationary waves measured is less than 1.5.

In all cases, the rising direction of the double polarizing T-connection is optional, since each of these high frequency terminals may be polarized separately.

Although the device which has just been described appears to afford the most advantages, it will be understood that various modifications may be made thereto without going beyond the scope of the invention, it being possible to replace certain elements of the device by others capable of fulfilling the same technical function therein.

A particularly interesting application of the device which is the object of the invention may be a double polarizing of two active circuits operating at hyperfrequencies.

What is claimed is:

1. A wide band polarizing T-connection for high frequency operation in connection with at least two active circuits, comprising a high frequency branch including a capacitor for blocking direct currents connected between said active circuits, and at least two polarizing branches connected between respective direct current sources and a respective side of said blocking capacitor for polarizing each active circuit including a bypass capacitor connected to each direct current source and to ground, said high frequency branch having a high value of impedance at the ends thereof and a relatively low value of impedance on either side of said blocking capacitor, the impedance transition of said high frequency branch being effected from the connection points of said polarization branches to said ends, wherein the length of the said high frequency branch between the said polarization branches is equal to three quarters of the wavelength in the substance forming the said high frequency branch for a central operating frequency.

2. A wide band polarizing T-connection for high frequency operation in connection with at least two active circuits, comprising a high frequency branch including a capacitor for blocking direct currents connected between said active circuits, and at least two polarizing branches connected between respective direct current sources and a respective side of said blocking capacitor for polarizing each active circuit including a bypass capacitor connected to each direct current source and to ground, said high frequency branch having a high value of impedance at the ends thereof and a relatively low value of impedance on either side of said blocking capacitor, the impedance transition of said high frequency branch being effected from the connection points of said polarization branches to said ends, characterized in that said high frequency branch consists of two microstrips having variable widths connected together at one end thereof by said blocking capacitor, said two microstrips being supported on a dielectric substance located within a conductive housing and being terminated at the other ends thereof by coaxial sockets mounted on said housing, said microstrips having a small width in the vicinity of said coaxial sockets and a relatively larger width adjacent said blocking capacitor, the transition between said portions of different width being effected from the points of connection of the said polarizing branches toward said sockets, said two polarizing branches each consisting of a wire one of whose ends is connected to one of the said microstrips on either side of the said blocking capacitor and the other end of which is connected to a respective one of said direct current sources and to a first plate of a respective bypass capacitor, whose second plate is connected to a wall of said housing.

3. A wide band polarizing T-connection according to claim 2, characterized in that the length of the said transitions is equal to a quarter of the wavelength in the microstrip at minimum operation frequency of the device.

4. A wide band polarizing T-connection according to claim 3 characterized in that the length of the said high frequency branch between the said polarization branches is equal to three quarters of the wavelength in the substance forming the said high frequency branch for a central operating frequency.

* * * * *